US012560343B2

(12) United States Patent

Munson, III

(10) Patent No.: US 12,560,343 B2

(45) Date of Patent: Feb. 24, 2026

(54) POWERED ROOF RIDGE VENTILATION SYSTEM

(71) Applicant: Leon E. Munson, III, Kaufman, TX (US)

(72) Inventor: Leon E. Munson, III, Kaufman, TX (US)

( * ) Notice: Subject to any disclaimer, the term of this patent is extended or adjusted under 35 U.S.C. 154(b) by 89 days.

(21) Appl. No.: 16/924,029

(22) Filed: Jul. 8, 2020

(65) Prior Publication Data

US 2020/0340695 A1 Oct. 29, 2020

Related U.S. Application Data

(60) Provisional application No. 62/872,528, filed on Jul. 10, 2019.

(51) Int. Cl.
| | |
|---|---|
| *F24F 7/02* | (2006.01) |
| *H02S 20/23* | (2014.01) |
| *H02S 40/38* | (2014.01) |

(52) U.S. Cl.
CPC .............. *F24F 7/025* (2013.01); *H02S 20/23* (2014.12); *H02S 40/38* (2014.12)

(58) Field of Classification Search
CPC ................................. F24F 7/025; H02S 20/23
See application file for complete search history.

(56) References Cited

U.S. PATENT DOCUMENTS

| | | | | |
|---|---|---|---|---|
| 6,227,963 | B1 * | 5/2001 | Headrick ................... | F24F 7/02 |
| | | | | 454/365 |
| 9,464,816 | B1 * | 10/2016 | Marks ..................... | F24F 7/025 |
| 2007/0074754 | A1 * | 4/2007 | Farquhar ................. | F24S 20/67 |
| | | | | 136/244 |
| 2007/0243820 | A1 * | 10/2007 | O'Hagin ................. | F24F 7/025 |
| | | | | 454/365 |
| 2010/0330898 | A1 * | 12/2010 | Daniels ................... | F24F 7/025 |
| | | | | 454/365 |
| 2012/0045983 | A1 * | 2/2012 | Eskola, III .............. | F24F 7/025 |
| | | | | 454/341 |
| 2013/0074428 | A1 * | 3/2013 | Allen ..................... | E04D 13/174 |
| | | | | 52/302.1 |
| 2014/0259998 | A1 * | 9/2014 | Railkar ................. | E04D 13/174 |
| | | | | 52/173.3 |

FOREIGN PATENT DOCUMENTS

| | | | | |
|---|---|---|---|---|
| JP | 2003161011 A | * | 6/2003 | ............. F24S 20/67 |

OTHER PUBLICATIONS

Best Materials, "8 inch High Solar Power Roof Vent w/ Battery Backup", https://www.bestmaterials.com/detail.aspx?ID=17351, 2012 , All Pages. (Year: 2012).*
HGTV, "The Perks of Solar Powered Attic Fans", https://www.hgtv. com/design/remodel/mechanical-systems/the-perks-of-solar-powered-attic-fans, Feb. 13, 2012, All Pages. (Year: 2012).*
Carter, "How to tell if you need an attic or whole-house fan", https://www.washingtonpost.com/business/2018/09/11/how-tell-if-you-need-an-attic-or-whole-house-fan/, 2018, All Pages. (Year: 2018).*
English machine translation of Masuda (JP-2003161011-A) provided by the EPO website, All Pages, 2023. (Year: 2023).*

* cited by examiner

*Primary Examiner* — Daniel P Malley, Jr.
(74) *Attorney, Agent, or Firm* — Braxton Perrone, PLLC; Gregory Perrone; Bobby W. Braxton

(57) ABSTRACT

A roof ventilation system having a housing with an integrated fan and power source, such as a solar panel, for integration into a roof ridge vent or a roof soffit and having a flexible center area to adjust the profile of the housing to accommodate the profile of the roof ridge vent or roof soffit.

13 Claims, 4 Drawing Sheets

POWERED ROOF RIDGE VENTILATION SYSTEM

PRIORITY

This application claims the benefit of priority to U.S. Provisional Application No. 62/872,528 filed Jul. 10, 2019, the entirety of which is incorporated herein by reference.

TECHNICAL FIELD

This disclosure relates generally to the field of attic and roof ventilation systems. It is particularly related to roof ridge ventilation devices for shingle roofs.

BACKGROUND OF THE INVENTION

It is known to ventilate attics under gable or hip style roofing by running a vent along the roof ridge or hip in some applications. Such vents are created by an open slot running along the roof ridge, essentially the length of the roof, which causes exhaust out of the attic by convection airflow and by suction from wind blowing across the roof.

A soffit ventilation system intake can be used in conjunction with a ridge vent to provide passive ventilation. The soffit vents allow fresh ambient air to flow into the attic to equalize attic temperature and pressure with the outside. As stale hot air is withdrawn from the ridge slot vent by convection and/or wind suction, it is replaced by fresh ambient air entering the attic through the soffit vents.

In certain climates, however, this passive approach to circulating the air from a building's attic is insufficient. Some homes do not have soffit vents that accompany the ridge vents to assist with proper air flow. Other structures have soffit vents that become blocked with dirt, vegetation growth, such as vines, insulation, or other impediments. In some locales, wind can be minimal for extended lengths of time, causing no air circulation in the attic and leaving hot, stale air blocked in the attic. This causes more effort from the home's cooling system to keep the home at a desired temperature, which in turn costs the homeowner more money to cool the home. What is needed, therefore, is a system that supplements or replaces the passive roof ridge vent system that is intended to circulate air flow in a building attic.

SUMMARY OF THE INVENTION

This invention is directed to a ventilation system and ventilator structure for use in ventilating a building having a sloped roof with an open slot disposed longitudinally along its ridge. The ventilator system is adapted to enhance the flow of air out of an attic through a ridge vent by disposing an integrated powered fan within the ridge vent apparatus. Additionally, a corresponding powered fan integrated within the soffit vent can augment the powered ridge vent fan by facilitating cooler air flow into the attic to replace removed hot air exiting from the ridge vent. This novel ventilator herein described can be incorporated into any ridge vent system to supplement existing ridge vents. The powered ridge vent system herein described can rely on solar power via local solar panels to power the fan unit to expedite removal of hot air. A corresponding solar panel in a soffit vent unit can expedite influx of cooler air.

The integrated powered ridge vent unit can be constructed through an injection molding process with a flexible point along the midpoint of the longitudinal axis of the ridge vent unit to accommodate any roof pitch or angle. When the fan is powered, hot air will be drawn upward in the attic toward the exhaust ports of the ridge vent unit. The integrated powered ridge vent unit herein described can be retrofitted into existing roofing and easily sealed and incorporated into a new roof installation.

In one embodiment a roofing apparatus is described, having an elongated vent having a cross-sectional profile corresponding to a roof peak; at least one fan within a housing integrated within the elongated vent; at least one power supply integrated within the elongated vent to provide energy to the at least one fan; an outlet area with the housing to allow air to escape from an area within a structure beneath the fan; and a flexible region at the substantial center of the elongated vent for adjustment of the cross sectional profile.

The described elongated vent can include one or more ventilation slots disposed on a lower side of the elongated vents. The power supply can be charged by or is a solar panel or the power supply can be a battery. The power supply can be hard-wired to an alternating current source or receive direct current in lieu of relying on solar energy or as a backup source. The elongated vent can be manufactured from metal or plastic.

In another embodiment herein described, a ventilation apparatus to facilitate flow of air in an attic includes a substantially L-shaped housing having a first leg in which at least one fan unit is disposed and a second leg in which at least one power supply is integrated; an outlet area within the housing to allow air to escape from the attic; and a flexible region between the first leg and the second leg for adjusting an angle between the first leg and the second leg, wherein the at least one fan unit is sized to be received by a corresponding opening in a downward facing side of a roof soffit.

In one embodiment the power supply can be charged by or is a solar panel. The power supply can be a battery. The fan can be hard-wired to an alternating current source or receive direct current in lieu of reliance on solar power or as a backup source of electricity. The substantially L-shaped housing is manufactured from plastic or metal.

In another embodiment, the presently described roofing apparatus includes a fan housing having a cross-sectional profile corresponding to a profile of an elongated roof vent for installation on a roof peak; at least one fan within the fan housing; at least one power supply integrated within the housing to provide energy to the at least one fan; an outlet area with the housing to allow air to escape from an area within a structure beneath the fan; and a flexible region at the substantial center of the housing for adjustment of the cross sectional profile of the fan housing. In this embodiment the power supply can be charged by or can be a solar panel. The power supply can be a battery, or the fan can be hard-wired to an alternating current source or receive direct current in lieu of reliance on solar power or as a backup electrical source. The fan housing can be manufactured from metal or plastic.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings and photographs, wherein:

DETAILED DESCRIPTION OF THE EMBODIMENTS

The detailed description set forth below is intended as a description of the present embodiments of the invention and is not intended to represent the only form in which the present invention may be constructed or utilized. The description sets forth the functions and sequences of steps for constructing and operating; the invention. It is to be understood, however, that the same or equivalent functions and sequences may be accomplished by different embodiments and that they are also intended to be encompassed within the scope of the invention.

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
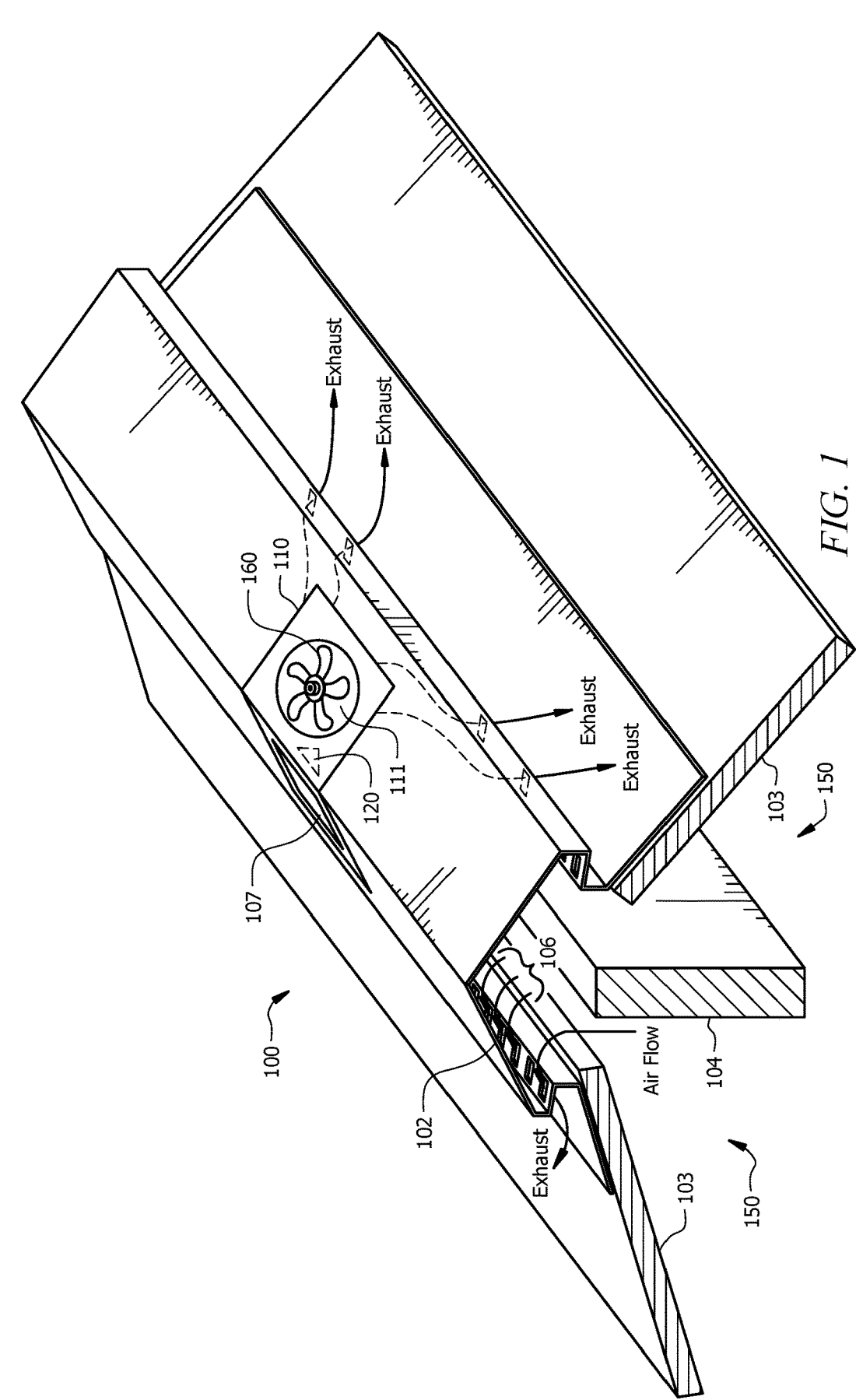
FIG. 1 depicts a perspective view of the presently described powered roof ridge ventilation system according to an embodiment of the present invention.

FIG. 1 depicts a perspective view of the presently described powered roof ridge ventilation system according to an embodiment of the present invention. In FIG. 1, powered roof ridge ventilation system 100 comprises a ridge vent 102 of a typical configuration. Ridge vent 102 comprises a peak 107 that replicates the roof's peak. Ridge vent 102 is situated above roof deck 103 on either side of peak 107, which in turn is the upper boundary of building or home attic space 150. Peak 107 is where each side of roof deck 103 would meet if not removed to accommodate ridge vent 102. Beneath ridge vent 102 in many roofs is ridge board 104 that spans the length of peak 107. Ridge vent 102 can include a series of vent slots 106. Vent slots 106 are customary to ridge vents and serve to allow hot air to escape from attic space 150. Vent slots 106 can operate in conjunction with soffit vents to promote better flow of hot air out of and cooler air into attic space 150.

At least one fan unit 110 is integrated within one side of ridge vent 102. Fan unit 110 comprises bladed fan 160 and fan unit opening 111. Fan unit opening 111 is the outlet port through which hot air moves away from fan unit 110 and eventually escapes attic space 150 through vent slots 106 in ridge vent 102. Fan unit 110 is powered by a power supply 120 housed in fan unit 110 and located beneath ridge vent 102. On an opposite side of ridge vent 102 (as shown in the top view of FIG. 2) in one embodiment is solar panel 112 that charges a battery associated with power supply 120. In other embodiments, fan unit 110 can be powered by electric power via hard-wiring.

In most embodiments, the fan unit 110, power supply 120 and bladed fan 160 are in a housing that is integrated into ridge vent 102. For illustrative purposes in FIG. 1, fan unit 110, power supply 120 and bladed fan 160 within the housing are visible from an aerial view of the roof. When installed, ridge vent 102 and these fan components are covered with shingles or other suitable roofing material. Thus, while solar panel 112 is exposed, at least the fan unit 110 and bladed fan 160 are covered, and thus not visible from the outside once installation and roof completion are complete.

Figure 4:
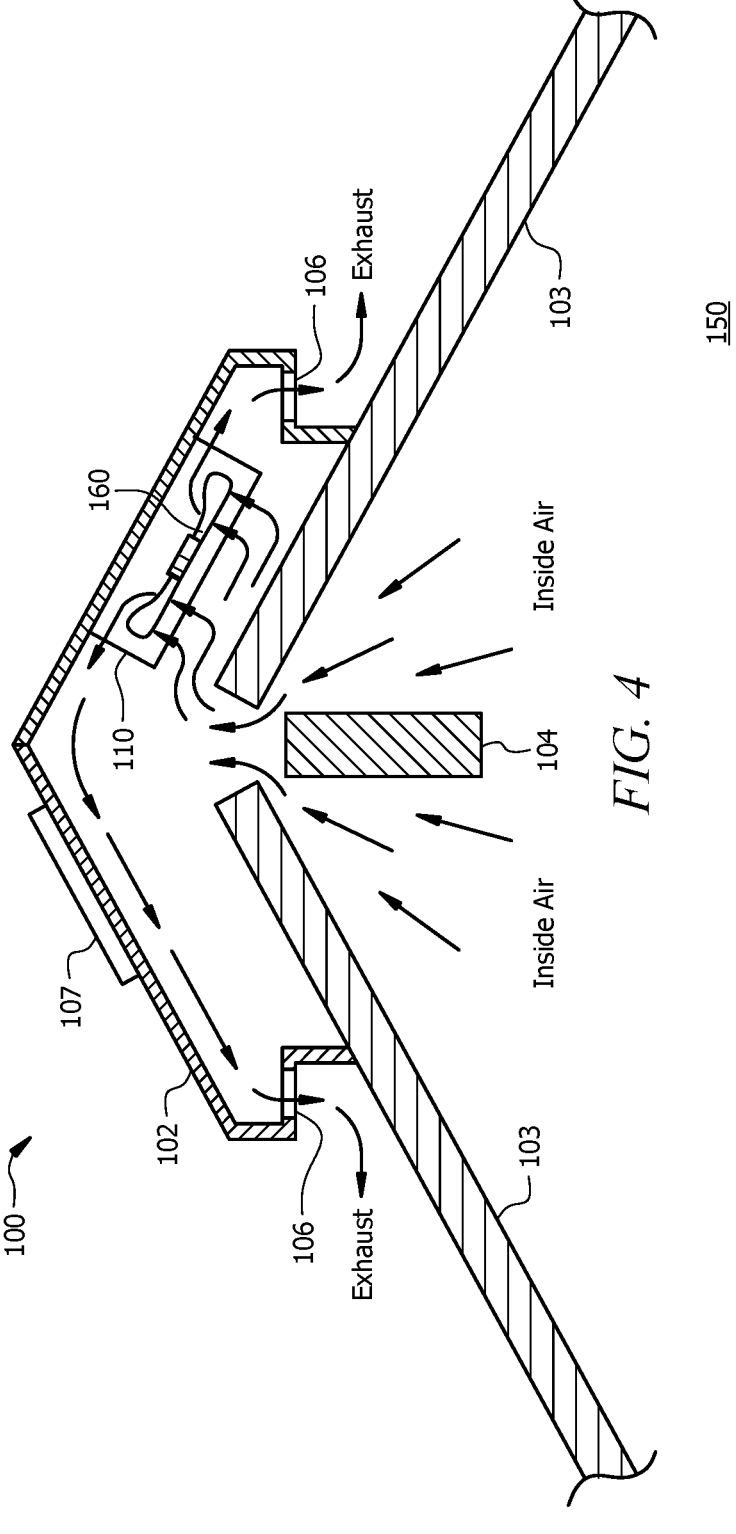
FIG. 4 depicts a side view of the presently described powered roof ridge ventilation system according to an embodiment of the present invention.

When running, bladed fan 160 draws up warm air from the attic space that circulates out through one or more fan unit openings 111, into and around the space surrounding fan unit 110. The air then flows out of through multiple ridge vent slots 106 in ridge vent 102. Although FIG. 1 depicts exhaust escaping one side of ridge vent 102 through vent slots 106, exhaust also escapes from vent slots 106 disposed along the opposite side of ridge vent 102. Exhaust flowing out of vent slots 106 in both sides of ridge vent 102 is shown in FIG. 4. In some embodiments, fan unit 110 includes a plurality of fan unit openings 111 in the sides of fan unit 110 to allow the flow and air away from fan blades 160.

FIG. 4 provides a side view of an embodiment. As shown in FIG. 4, fan unit 110 with bladed fan 160 is installed within ridge vent 102 in the interior of attic 150. Ridge vent 102 includes a number of vent slots 106 along all or part of the lower side of ridge vent 102. As shown, when bladed fan 160 is running air within attic 150 is drawn upward to the fan and forced through fan blades 160, out of fan unit openings 111 in the sides of fan unit 110. The air passing through fan blades 160 and out of fan unit openings 111 then flows towards vent slots 106 in ridge vent 102 to escape the attic. As described, fan unit 110 with bladed fan 160 provides circulation and escape of hot air within attic 150. By operation of fan unit 110, cooler exterior air that can be drawn into attic 150 through soffit vents (with or without the assistance of an embodiment of the invention installed in the soffit as described below), circulates up to fan unit 110 and facilitates exhaust of warm air through vent slots 106.

Figure 2:
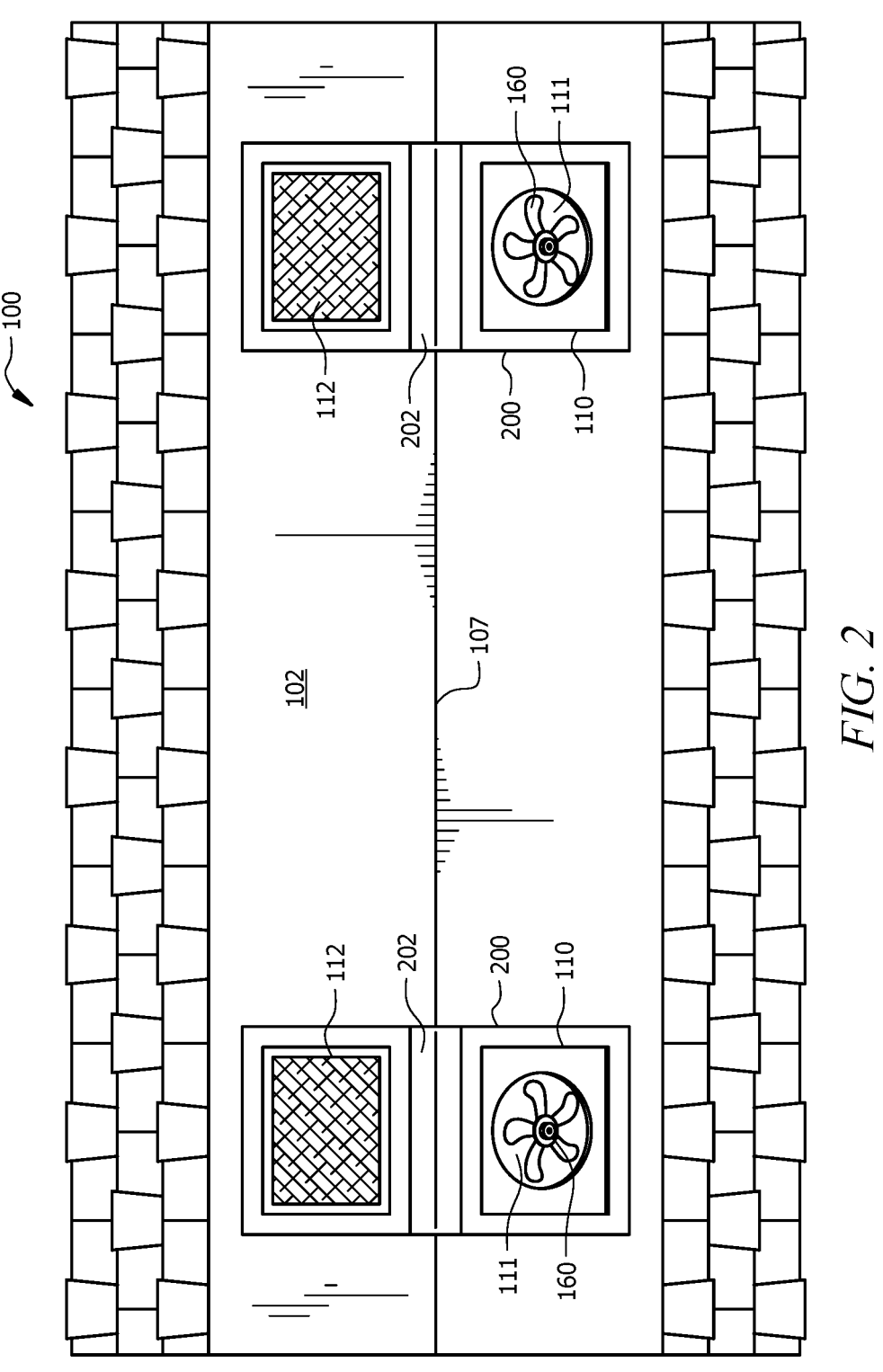
FIG. 2 depicts a top view of the presently described powered roof ridge ventilation system according to an embodiment of the present invention.

FIG. 2 is a top view of an embodiment of the roof ridge ventilation system 100 according to an embodiment of the present invention. Note that in FIG. 2, fan unit 110 and bladed fan 160 within housing 200 are exposed during construction. In FIG. 2, ridge vent 102 runs the length of a roof ridge or hip, with the peak 107 of ridge vent 102 spanning the length of ridge vent 102. Disposed within ridge vent 102 is fan housing 200. Fan housing 200 includes fan unit 110 and solar panel 112. Solar panel 112 includes conductors that store energy from sunlight and convert it into DC electricity. This electricity can operate fan unit 110 of charge a power supply such as a battery associated with fan unit 110 to operate it. One or more fan housing 200 can be installed within ridge vent 102. Fan housing 200 can be integrated into ridge vent 102 at the factory as a single manufactured unit. In the alternative, fan housing 200 can be retrofitted into previously fabricated ridge vents 102 or even previously installed ridge vents.

In order to accommodate installation of fan housing 200 into a previously installed ridge vent, fan housing 200 includes flexible region 202. Flexible region 202 allows fan housing 200 to be placed on peak 107 of a roof having a roof deck 103 at various pitch angles. Flexible region 202 is located at the substantial center of fan housing 200, allowing fan housing to be "opened" or "closed" or folded at various angles to align with the pitch of roof deck 103. In this manner, flexible region 202 permits fan housing 200 to be seamlessly installed within a previously installed or previously manufactured ridge vent. One or more fan housings 200 can be installed within ridge vent 102, depending on the size of the roof, the volume of attic space 150 and/or the length of peak 107.

5 6

Figure 3:
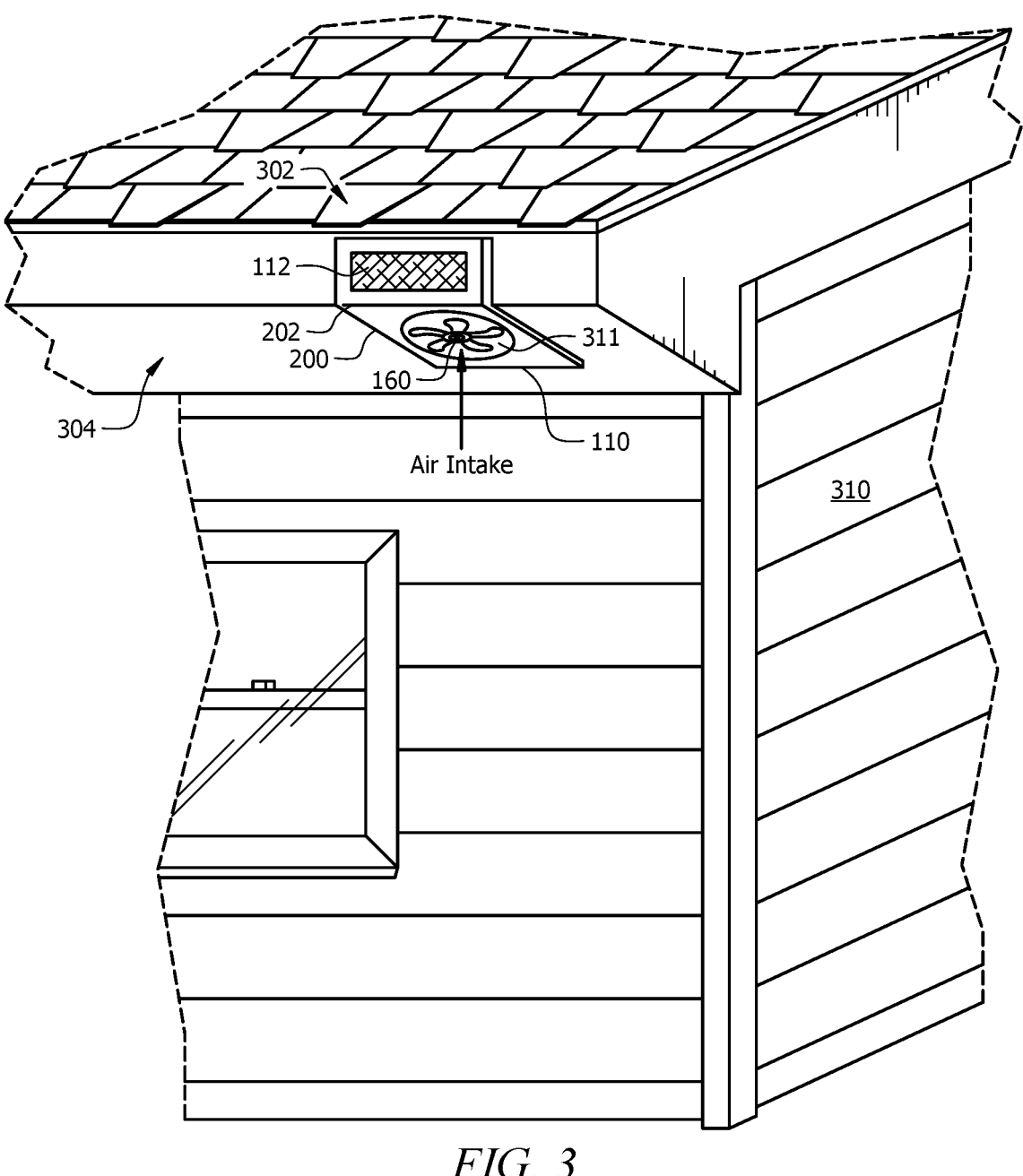
FIG. 3 depicts a perspective view of the presently described powered roof ridge ventilation system incorporating a powered soffit ventilator according to an embodiment of the present invention.

FIG. 3 depicts a perspective view of the presently described powered roof ridge ventilation system incorporating a powered soffit ventilator according to an embodiment of the present invention. In FIG. 3, roof 302 above house 310 is shown. Beneath the portion of roof 302 extending from house 310 is soffit 304. A soffit is akin to an "outdoor ceiling" that encloses the home's attic and isolates the attic from the exterior of house 310. As shown, on the underside of soffit 304 is disposed fan housing 200, including fan unit 110 having bladed fan 160 and opening 311. In some embodiments, fan housing 200 is installed in the space of a pre-existing soffit vent. In some structures, an opening in the soffit covered by a screen or the like provides at least a minimal amount of air intake into attic 150 to help circulation and cooling. Fan housing 200 and the fan components can be installed in pre-existing soffit vent opening and covered by a screen or the like on the exterior side of fan housing to prevent debris from clogging or otherwise impeding operation of fan unit 110 and bladed fan 160. In other situations, fan housing and the associated fan components and power supply can be installed within an opening cut in the soffit in the first instance during new construction or remodeling. In this embodiment, installation of a screen on the exterior side of fan housing 200 is desirable to prevent debris and the like from impeding operation of the fan. The screen is sized in accordance with the dimensions of fan housing 200 to efficiently fit over the fan housing to provide adequate protection.

In the case of a powered unit installation in the soffit, opening 311 will draw cool exterior air into attic space 150, which in turn forces hot air out of opening 311 on powered fan unit 110 on ridge vent 102 at the peak of roof 302.

The other half of fan housing 200 includes solar panel 112. Fan housing 200 also includes flexible region 202 for situating solar panel 112 half of fan housing 200 at various angles in relation to the fan unit 110 half of fan housing 200. In this manner, solar panel 112 can be installed on the face of roof 302, for example, in order to better collect energy from sunlight. As shown, the fan unit 110 half of fan housing 200 faces downward and is typically in a shaded area, making it advantageous to mount solar panel 112 on a plane in which it will receive more or direct sunlight for charging the power supply of fan housing 200. As shown, fan unit 110 will cause cooler air from the outside of the attic to be sucked into opening 311, causing more air circulation within attic space 150 and better flow of hot air out of attic space 150 out of vent slots 106 (if present) and fan opening 111.

The presently described powered ridge vent ventilation system promotes better air flow in attic spaces and facilitates the removal of hot air from the attic space in a more efficient and cost-effective manner than traditional ridge vents. When supplemented by a powered soffit ventilation system as described, hot air is more rapidly removed from the attic space. In this manner, a homeowner is better able to regulate the cool temperature of the living area of the home and place less strain and demand on the home's cooling system. The embodiments of the ridge roof vent having the presently described integrated fan and power supply can be fabricated in whole or in part from metal, plastic or other suitable material.

While the disclosed embodiments have been described with reference to one or more particular implementations, these implementations are not intended to limit or restrict the scope or applicability of the invention. Those having ordinary skill in the art will recognize that many modifications and alterations to the disclosed embodiments are available. Therefore, each of the foregoing embodiments and obvious variants thereof is contemplated as falling within the spirit and scope of the disclosed inventions.

While the invention has been particularly shown and described with reference to a preferred embodiment, it will be understood by those skilled in the art that various changes in form and detail can be made therein without departing from the spirit and scope of the invention.

I claim:

1. A ventilation system, comprising:
an elongated ridge vent having a cross-sectional profile corresponding to a roof peak, comprising:
a first fan within a housing integrated within the elongated ridge vent
a first solar panel integrated within the elongated ridge vent to provide energy to the at least one fan;
a first outlet area within the first housing to allow air to escape from an area within a structure beneath the fan;
a first flexible region at the substantial center of the elongated ridge vent for adjustment of the cross sectional profile;
a substantially L-shaped housing having a first leg in which a second fan is disposed and a second leg in which a second solar panel is integrated;
a second outlet area within the substantially L-shaped housing to allow air to escape from the attic; and
a second flexible region between the first leg and the second leg for adjusting an angle between the first leg and the second leg,
wherein the second fan is sized to be received by a corresponding opening in a downward facing side of a roof soffit.

2. The ventilation system of claim 1, further comprising a plurality of ventilation apertures.

3. The ventilation system of claim 1, further comprising a power supply charged by the first solar panel.

4. The ventilation system of claim 1, further comprising a power supply hard-wired to an alternating current source.

5. The ventilation system of claim 1, wherein the elongated ridge vent is manufactured from metal.

6. The ventilation system of claim 1, wherein the elongated ridge vent is manufactured from plastic.

7. A ventilation system, comprising:
a roof ridge vent comprising:
a fan housing having a cross-sectional profile corresponding to a profile of an elongated roof vent for installation on a roof peak;
a first fan within the fan housing;
a first solar panel integrated within the fan housing to provide energy to the first fan;
a first outlet area within the housing to allow air to escape from an area within a structure beneath the fan; and
a flexible region at the substantial center of the housing for adjustment of the cross sectional profile of the fan housing
a substantially L-shaped housing having a first leg in which a second fan is disposed and a second leg in which a second solar panel is integrated;
a second outlet area within the substantially L-shaped housing to allow air to escape from the attic; and
a second flexible region between the first leg and the second leg for adjusting an angle between the first leg and the second leg,
wherein the second fan is sized to be received by a corresponding opening in a downward facing side of a roof soffit.

8. The ventilation system of claim 7, further comprising a power supply integrated into the fan housing that is charged by the first solar panel.

9. The ventilation system of claim 7, wherein the first fan is hard-wired to an alternating current source.

10. The ventilation system of claim 1, wherein the first fan receives direct current.

11. The ventilation system of claim 1, wherein the fan housing is manufactured from plastic.

12. The ventilation system of claim 1, wherein the fan housing is manufactured from metal.

13. The ventilation system of claim 2, wherein the plurality of ventilation apertures comprises a plurality of slots.

* * * * *